United States Patent
Uoya et al.

(10) Patent No.: US 10,989,541 B2
(45) Date of Patent: Apr. 27, 2021

(54) TRAVEL ROUTE GENERATION DEVICE AND TRAVEL ROUTE GENERATION METHOD

(71) Applicant: Kubota Corporation, Osaka (JP)

(72) Inventors: Yasuhisa Uoya, Amagasaki (JP); Izuru Shimamoto, Amagasaki (JP); Kenji Tamatani, Amagasaki (JP); Megumi Suzukawa, Amagasaki (JP); Atsushi Shinkai, Sakai (JP); Kazuo Sakaguchi, Amagasaki (JP)

(73) Assignee: KUBOTA CORPORATION, Osaka (JP)

(*) Notice: Subject to any disclaimer, the term of this patent is extended or adjusted under 35 U.S.C. 154(b) by 252 days.

(21) Appl. No.: 16/395,249

(22) Filed: Apr. 26, 2019

(65) Prior Publication Data

US 2019/0249991 A1    Aug. 15, 2019

Related U.S. Application Data

(62) Division of application No. 15/624,715, filed on Jun. 16, 2017, now abandoned.

(30) Foreign Application Priority Data

Jan. 20, 2017 (JP) .................................. 2017-008344
Jan. 20, 2017 (JP) .................................. 2017-008355

(51) Int. Cl.
  *G01C 21/20* (2006.01)
  *G05D 1/02* (2020.01)
  *A01B 69/04* (2006.01)

(52) U.S. Cl.
  CPC ............ *G01C 21/20* (2013.01); *A01B 69/008* (2013.01); *G05D 1/0219* (2013.01); *G05D 2201/0201* (2013.01)

(58) Field of Classification Search
  CPC .... G01C 21/20; A01B 69/008; G05D 1/0219; G05D 2201/0201
  See application file for complete search history.

(56) References Cited

U.S. PATENT DOCUMENTS 6,205,381 B1 * 3/2001 Motz .................... A01B 69/008
  340/988
7,502,678 B2 * 3/2009 Diekhans ............. A01B 69/008
  172/4.5

(Continued)

FOREIGN PATENT DOCUMENTS

EP    3042554    7/2016
JP    09-154315  6/1997

(Continued)

OTHER PUBLICATIONS

Extended European Search Report for corresponding EP Application No. 17001059.9-1006, dated Feb. 5, 2018.

(Continued)

*Primary Examiner* — Hussein Elchanti
(74) *Attorney, Agent, or Firm* — Mori & Ward, LLP (57) ABSTRACT

A travel route generation device includes circuitry configured to calculate positions of a starting point, an end point, and intermediate points from a start vehicle position, an end vehicle position, and intermediate vehicle positions, respectively, based on a distance from a contour point to a reference point. The circuitry is configured to define the shape of the target work region by calculating a line connecting the starting point, the intermediate points, and the end point, the line defining the shape of the target work region. The circuitry is configured to generate a travel route along which the work vehicle is to travel in the target work region.

10 Claims, 5 Drawing Sheets

(56) References Cited

U.S. PATENT DOCUMENTS

| | | | |
|---|---|---|---|
| 8,046,139 B2 * | 10/2011 | Diekhans | A01D 41/1278 |
| | | | 701/50 |
| 8,204,654 B2 * | 6/2012 | Sachs | A01B 79/005 |
| | | | 701/50 |
| 2004/0193349 A1 | 9/2004 | Flann et al. | |
| 2005/0273253 A1 * | 12/2005 | Diekhans | G01C 21/20 |
| | | | 701/50 |
| 2007/0192024 A1 | 8/2007 | Flann et al. | |
| 2009/0216406 A1 * | 8/2009 | Senneff | A01B 69/007 |
| | | | 701/42 |
| 2016/0157275 A1 * | 6/2016 | Matthews | H04W 72/005 |
| | | | 701/2 |
| 2016/0174453 A1 | 6/2016 | Matsuzaki et al. | |
| 2017/0300064 A1 * | 10/2017 | Wolters | G05D 1/0217 |

FOREIGN PATENT DOCUMENTS

| | | |
|---|---|---|
| JP | 2016-31649 | 3/2016 |
| WO | WO 2012/142395 | 10/2012 |
| WO | WO 2017/004074 | 1/2017 |

OTHER PUBLICATIONS

Office Action with Form PTO-892 Notice of References Cited issued by the U.S. Patent and Trademark Office for the parent U.S. Appl. No. 15/624,715, dated Jul. 16, 2018.

Office Action with Form PTO-892 Notice of References Cited issued by the U.S. Patent and Trademark Office for the parent U.S. Appl. No. 15/624,715, dated Dec. 4, 2018.

* cited by examiner

FIG. 4

TRAVEL ROUTE GENERATION DEVICE AND TRAVEL ROUTE GENERATION METHOD

CROSS-REFERENCE TO RELATED APPLICATIONS

The present application is a divisional application of the U.S. patent application Ser. No. 15/624,715, filed Jun. 16, 2017, which claims priority under 35 U.S.C. § 119 to Japanese Patent Application No. 2017-008344, filed Jan. 20, 2017 and to Japanese Patent Application No. 2017-008355, filed Jan. 20, 2017. The contents of these applications are incorporated herein by reference in their entirety.

BACKGROUND OF THE INVENTION

Field of the Invention

The present invention relates to a travel route generation device and a travel route generation method.

Discussion of the Background

In recent years, a work vehicle that works while automatically traveling in a work field has been proposed. In order to cause a work vehicle to travel automatically in this way, it is necessary to generate a travel route that serves as a travel target. In order to generate a travel route that covers a work field, it is a precondition to accurately grasp a shape of the work field. Since a work field such as a field is divided by a private farm road or the like, it is difficult to determine an accurate shape of the work field from a general map.

Therefore, Unexamined Japanese Patent Publication No. 2016-31649 discloses teaching travel by which a manually operated tractor travels within a field to acquire external shape data of the field from a locus of the travel.

SUMMARY OF THE INVENTION

According to one aspect of the present invention, a travel route generation device includes a position sensor, a point input interface, and circuitry. The position sensor is to detect a position of a reference point on a work vehicle, the work vehicle being to travel in a work field. A starting vehicle position is input via the point input interface such that the reference point is positioned at the starting vehicle position when a contour point on an outermost contour of the work vehicle is substantially on a starting point when viewed in a vertical direction. An end vehicle position is input via the point input interface such that the reference point is positioned at the end vehicle position when the contour point is substantially on an end point when viewed in the vertical direction. Intermediate vehicle positions are input via the point input interface such that the reference point is positioned at the intermediate vehicle positions when the contour point is substantially on the intermediate points when viewed in the vertical direction. The starting point, the end point, and the intermediate points define a shape of a target work region in which the work vehicle is to work in the work field. The circuitry is configured to calculate positions of the starting point, the end point, and the intermediate points from the start vehicle position, the end vehicle position, and the intermediate vehicle positions, respectively, based on a distance from the contour point to the reference point, to define the shape of the target work region by calculating a line connecting the starting point, the intermediate points, and the end point, the line defining the shape of the target work region, and to generate a travel route along which the work vehicle is to travel in the target work region.

According to another aspect of the present invention, a travel route generation method includes positioning a contour point on an outermost contour of a work vehicle substantially on a starting point in a work field when viewed in a vertical direction. A position of a reference point on the work vehicle is detected as a starting vehicle position when the contour point is substantially on the starting point. The contour point is positioned substantially on intermediate points in the work field when viewed in the vertical direction. Positions of the reference point are detected as intermediate vehicle positions when the contour point is substantially on the intermediate points, respectively. The contour point is positioned substantially on an end point in the work field when viewed in the vertical direction. A position of the reference point is detected as an end vehicle position when the contour point is substantially on the end point. Positions of the starting point, the intermediate points, and the end point are calculated from the start vehicle position, the intermediate vehicle positions, the end vehicle position, respectively, based on a distance from the contour point to the reference point. A shape of a target work region is defined by calculating a line connecting the starting point, the intermediate points, and the end point, the line defining the shape of the target work region, the work vehicle being to work in the target work region. A travel route along which the work vehicle is to travel in the target work region is generated.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Figure 1:
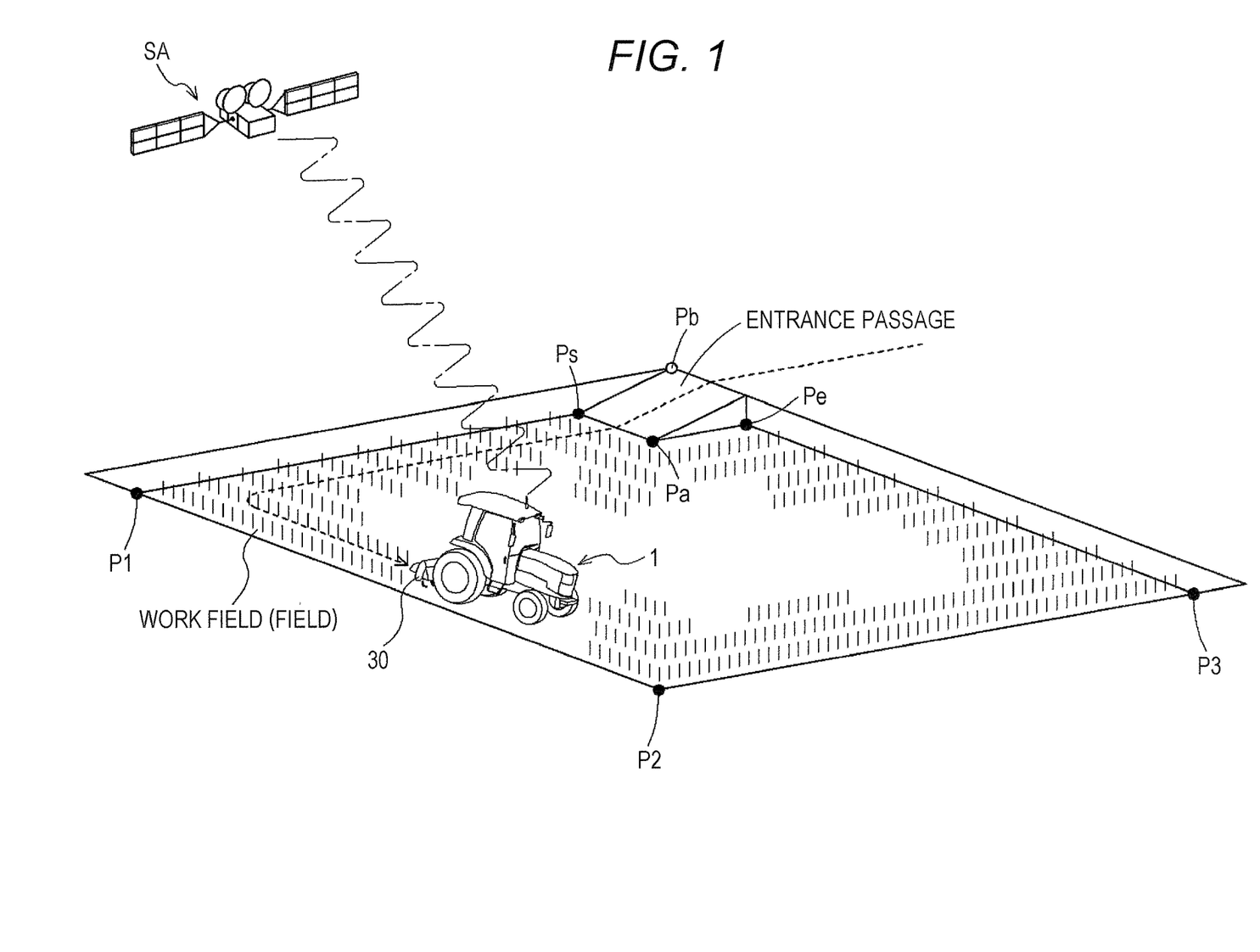
FIG. 1 is a schematic view illustrating how a work vehicle enters a work field divided by a ridge through an entrance passage and measures a shape of the work field.

A work vehicle equipped with a travel route generation device according to one exemplary embodiment of the present invention will be described with reference to the drawings. In this exemplary embodiment, the work vehicle is a tractor equipped with a work device 30 in a vehicle body 1. To begin with, the tractor is operated by a user to perform teaching travel for calculating a field shape. In this teaching travel, the tractor enters a field through an entrance passage inclined downward from a farm road, and performs circumferential travel along a boundary of the field divided by a ridge. At that time, as will be described in detail later, a first endpoint on a ridge side of the entrance passage is position-registered as a starting point Ps, shape feature points that prescribe the field shape are position-registered as intermediate points P1, P2, and P3, and a second endpoint facing the first endpoint on the ridge side of the entrance passage is position-registered as an end point Pe. A basic shape of the field is calculated by a line that connects the starting point Ps, the intermediate points P1, P2, and P3, and the end point Pe. A region obtained by excluding the entrance passage from this basic shape of the field is referred to as a target work region. Furthermore, a shape of the entrance passage is regarded as a quadrangle, a vertex that is adjacent to the target work region in vertices other than the starting point Ps and the end point Pe is defined as an inner point Pa, and a vertex distant from the target work region is defined as an outer point Pb.

Figure 2:
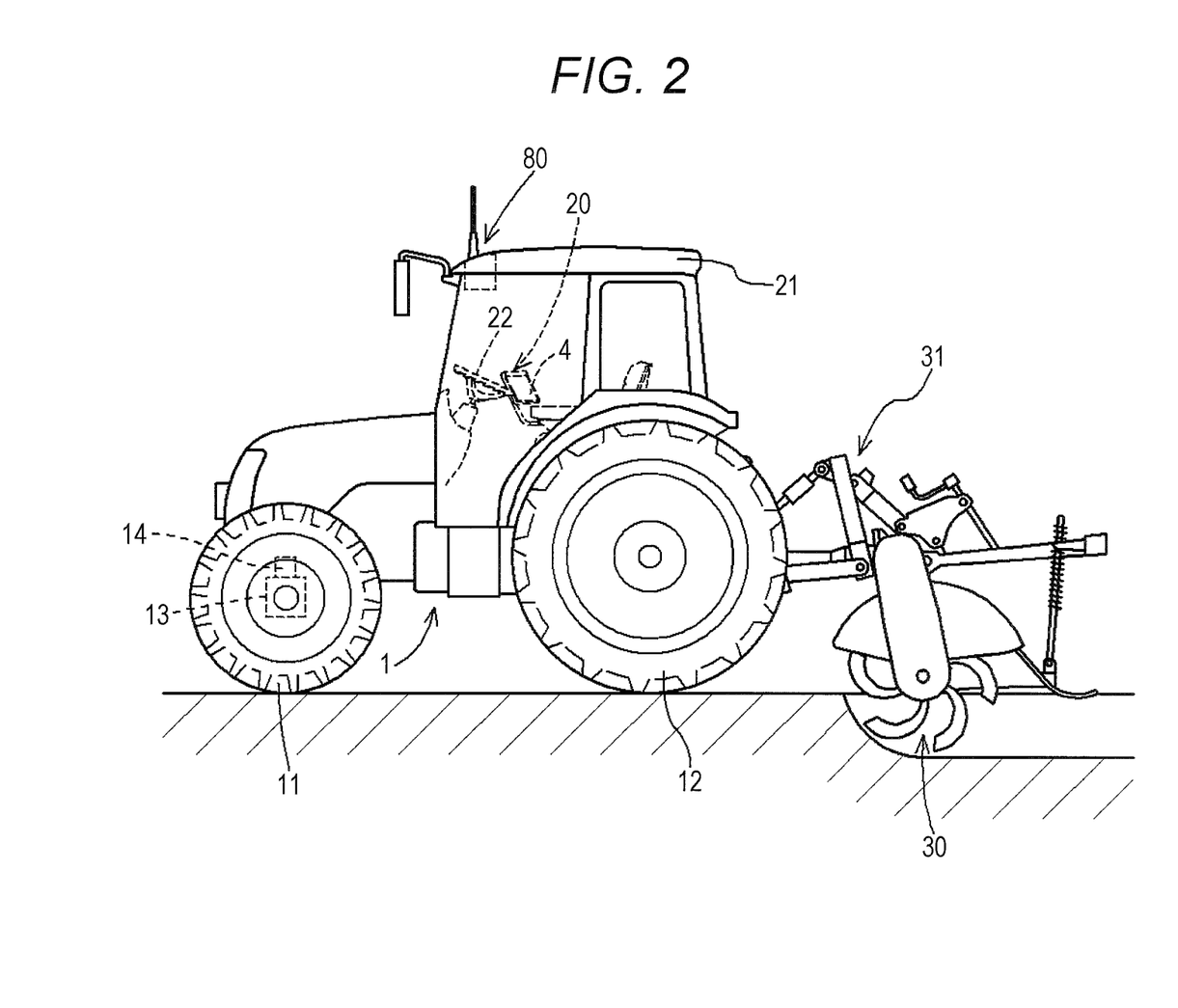
FIG. 2 is a side view of a tractor, which is one example of the work vehicle.

As illustrated in FIG. 2, this tractor is provided with a cab 20 in a central portion of the vehicle body 1 supported by front wheels 11 and rear wheels 12. The tractor is equipped with the work device 30, which is a rotary tilling machine, via a hydraulic lifting mechanism 31 at a rear of the vehicle body 1. The front wheels 11 function as steering control wheels through which the tractor changes a travel direction when a steering angle of the steering control wheels is changed. The steering angle of the front wheels 11 is changed by an operation of a steering mechanism 13. The steering mechanism 13 includes a steering motor 14 for automatic steering. For manual traveling, the front wheels 11 can be steered by operating a steering wheel 22 disposed in the cab 20. The cab 20 is equipped with a general purpose terminal 4 that provides a user with information and receives instructions from the user. In a cabin 21 of the tractor, a satellite positioning module 80 is provided. As a component of the satellite positioning module 80, a satellite antenna for receiving a global navigation satellite system (GNSS) signal (including a GPS signal) is attached at a ceiling area of the cabin 21. Note that the satellite positioning module 80 may be combined with an inertial navigation module incorporated with a gyro acceleration sensor and a magnetic director sensor for complementing satellite navigation. As a matter of course, the inertial navigation module may be provided in a different location from the location of the satellite positioning module 80.

Figure 3:
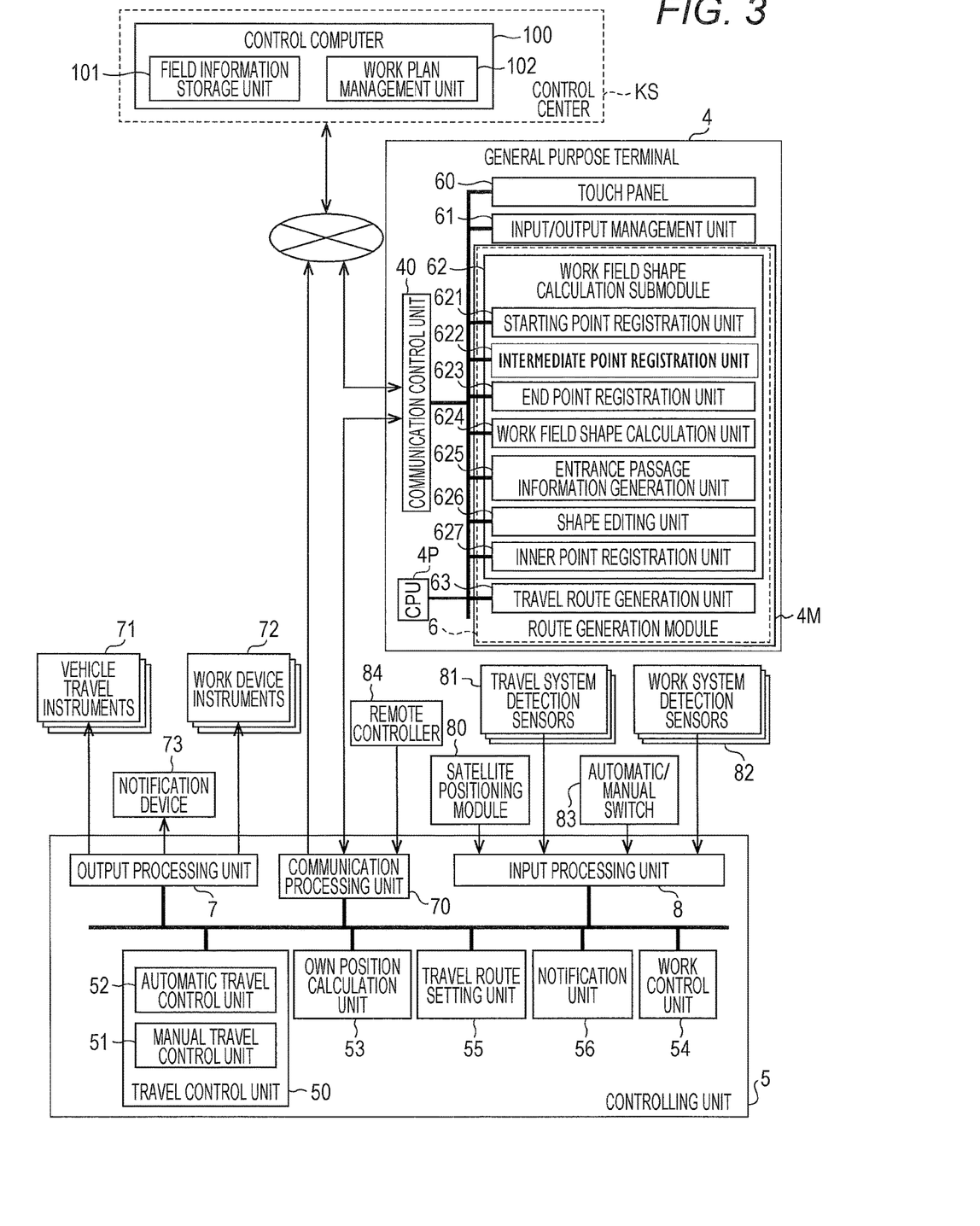
FIG. 3 shows a structure of the travel route generation device according to the embodiment of the present invention.

FIG. 3 illustrates a control system configured in this tractor. The control system of this exemplary embodiment includes a first control unit, which is the general purpose terminal 4 including a graphical user interface, a controlling unit 5 that controls the vehicle body 1 and the work device 30 of the tractor, and a remote controller 84 for wirelessly controlling travel start and travel stop of the tractor from outside. The travel route generation device according to the embodiment of the present invention is modularized as a route generation module 6, and is incorporated into the general purpose terminal 4.

In addition to the route generation module 6, the general purpose terminal 4 has functions of a general computer system, such as a communication control unit 40, a touch panel 60 (a point input interface 60), and an input/output management unit 61 that manages an input operation on the touch panel 60 and information display on the touch panel 60. The general purpose terminal 4 is coupled to the controlling unit 5 in such a manner that the general purpose terminal 4 can exchange data by vehicle-mounted LAN, wireless communication, cable communication, or the like.

Furthermore, the general purpose terminal 4 can exchange data with a control computer 100 configured in a remote control center KS via a wireless channel or the Internet. In addition, it is also possible to carry the general purpose terminal 4 out of the tractor for use if the general purpose terminal 4 is configured as a device such as a tablet computer and a cellular phone and is data-exchangably coupled to the control system of the tractor.

In this exemplary embodiment, field information including a position of the field on a map and arrangement of farm roads surrounding the field is stored in a field information storage unit 101 of the control computer 100, and this field information is needed for finding out the field to work. The control computer 100 also includes a work plan management unit 102 that manages a work plan describing the work in a specified field. The general purpose terminal 4 can access the control computer 100, and download the field information from the field information storage unit 101 and the work plan from the work plan management unit 102. Alternatively, the general purpose terminal 4 can also input the field information and the work plan via a recording medium such as a USB memory.

The route generation module 6 includes a work field shape calculation submodule 62 that calculates a shape of the target work region, which is a valid work region of the field, through the teaching travel, and a travel route generation unit 63 that generates a travel route for the tractor to travel in the target work region. The work field shape calculation submodule 62 includes a starting point registration unit 621, an intermediate point registration unit 622, an end point registration unit 623, a basic shape calculation unit 624, an entrance passage information generation unit 625, and a shape editing unit 626. Furthermore, an inner point registration unit 627 is also prepared as an option. Specifically, the general purpose terminal 4 includes a central processing unit (CPU) 4P (circuitry 4P) and a memory 4M. Programs of the route generation module 6 including the work field shape calculation submodule 62 and the travel route generation unit 63 are stored in the memory 4M and executed by the CPU 4P to perform a function of the route generation module 6.

Figure 4:
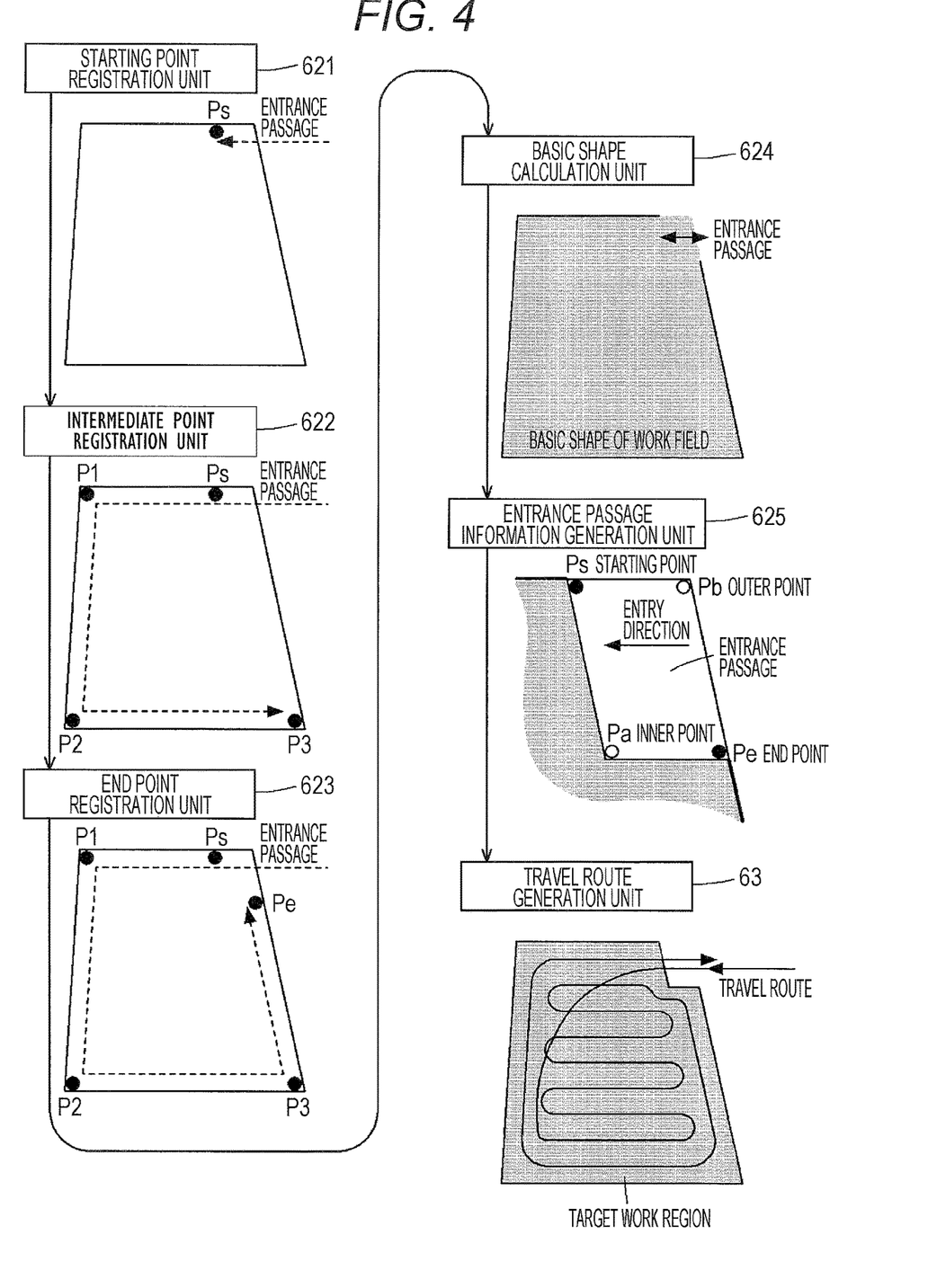
FIG. 4 is a flowchart illustrating a process of calculating shapes of the work field and the entrance passage in the travel route generation device.
Figure 5:
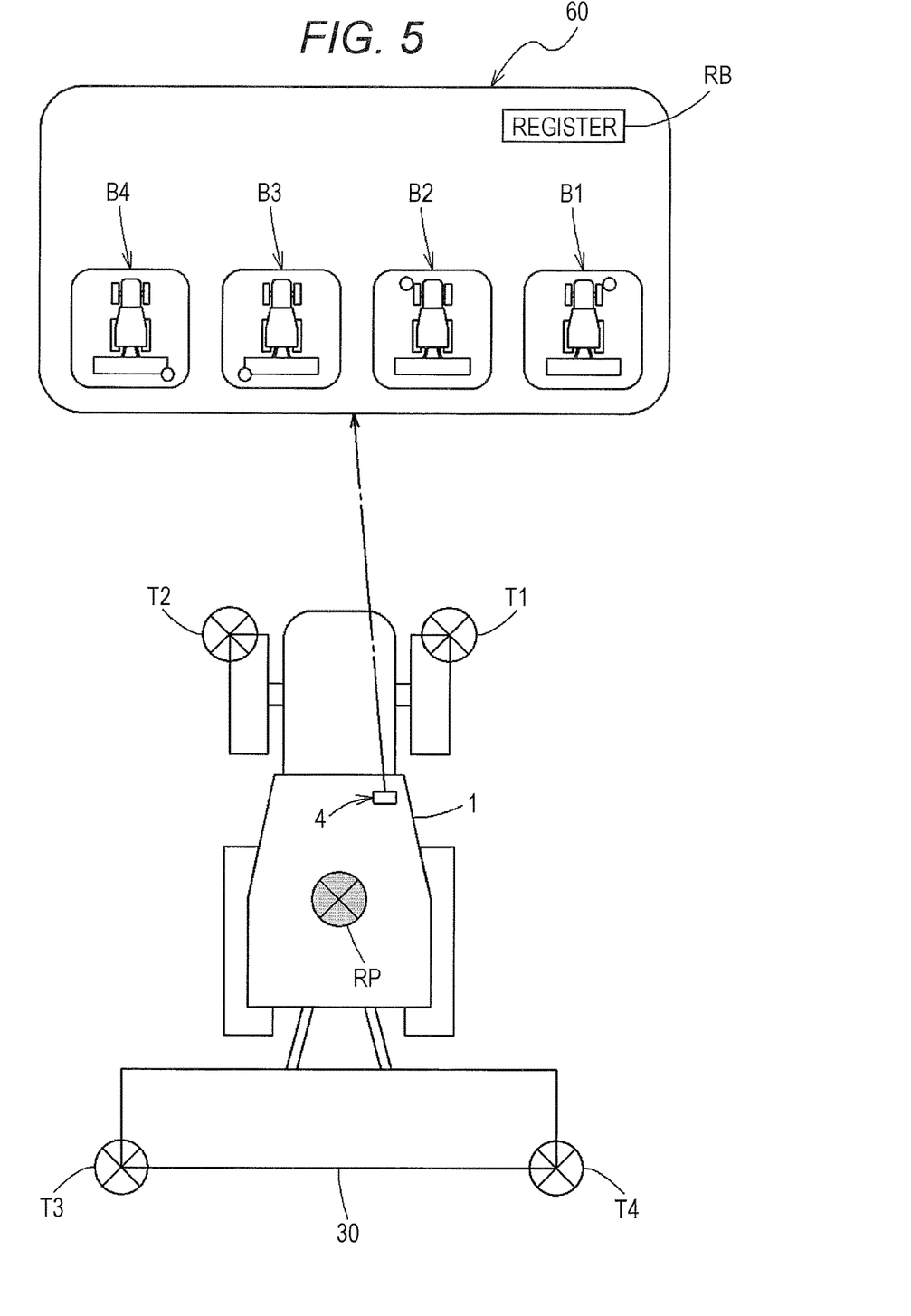
FIG. 5 is a schematic view illustrating a relationship between aiming points set in the tractor and aiming point selection buttons displayed on a touch panel.

Next, a basic role of each functional unit of the route generation module 6 will be described with reference to a flowchart of a field shape calculation process and a travel route generation process illustrated in FIG. 4. In FIG. 4, the field shape is a trapezoid, and an entrance passage inclined downward is provided at a right end of an upper side. Furthermore, as illustrated in FIG. 5, aiming points T1, T2, T3, and T4 are prescribed at four corners of the tractor. Distances between these aiming points T1, T2, T3, and T4 and the own position based on positioning data from the satellite positioning module 80 (illustrated with a black dot at the center of the vehicle body in FIG. 5) are set in advance. Position coordinates of the aiming points T1, T2, T3, and T4 can be calculated from the own position. The touch panel 60 displays aiming point selection buttons B1, B2, B3, and B4, and the aiming point corresponding to the pushed aiming point selection button B1, B2, B3, or B4 becomes valid in the following field shape calculation process.

The tractor that passes through a farm road and reaches the target field performs teaching travel in order to calculate the shape of the field. Here, the aiming point selection button B1 is pushed, and the aiming point T1 is valid.

To begin with, a driver operates the tractor such that the tractor passes through the entrance passage and that the aiming point T1 comes to a right end (first endpoint) after going down the entrance passage. The driver then pushes a registration button RB displayed on the touch panel 60 (see FIG. 5). Accordingly, the starting point registration unit 621 registers the first endpoint as a starting point (illustrated with a black dot and Ps in FIG. 4).

Next, the driver advances the tractor such that the aiming point T1 comes to a left end of the upper side, which is a shape feature point of the field (geometrical shape body, here, a vertex of the trapezoid), and then pushes the registration button RB. Accordingly, the intermediate point registration unit 622 registers the left end of the upper side as a first intermediate point (illustrated with a black dot and P1 in FIG. 4). Furthermore, the driver advances the tractor such that the aiming point T1 comes to a left end of a lower side, and then pushes the registration button RB. Accordingly, the intermediate point registration unit 622 registers the left end of the lower side as a second intermediate point (illustrated with a black dot and P2 in FIG. 4). Furthermore, the driver advances the tractor such that the aiming point T1 comes to a right end of the lower side, and then pushes the registration button RB. Accordingly, the intermediate point registration unit 622 registers the right end of the lower side as a third intermediate point (illustrated with a black dot and P3 in FIG. 4).

Next, the driver advances the tractor along the ridge (boundary) from the right end of the lower side of the field at which the third intermediate point is set, stops the tractor at a position at which the aiming point T1 comes to an endpoint that is an intersection of the entrance passage and the boundary, and then pushes the registration button RB. Since the position at which the registration button RB is pushed is close to the starting point, the end point registration unit 623 regards this position as an end point (illustrated with a black dot and Pe in FIG. 4) and registers the position. Alternatively, the driver may instruct the end point registration unit 623 that the registered position is the end point, by performing an instruction operation of indicating the end point and then pushing the registration button RB.

Accordingly, position coordinates of the starting point, the three intermediate points, and the end point are obtained. The basic shape calculation unit 624 connects these points to calculate the basic shape of the work field.

Next, the entrance passage information generation unit 625 generates entrance passage information, such as a shape and size of the entrance passage and a travel direction in the entrance passage. As illustrated in FIG. 4, since the entrance passage is a partial passage, the entrance passage may be substantially regarded as a quadrangle. Two opposite vertices of this quadrangle indicating the entrance passage are the starting point and the end point (illustrated with black dots and Ps and Pe in FIG. 4). Therefore, the shape and size of the entrance passage are obtained by calculating two more vertices. Therefore, when this quadrangle indicating the entrance passage is regarded as a parallelogram (including a rectangle and a square) with extension lines of the boundary lines of the adjacent field (external shape extension lines of the work field basic shape) as two sides, position coordinates of a vertex inside the field (referred to as an outer point) and a vertex outside the field (referred to as an inner point) can be easily calculated by geometric calculation. In FIG. 4, the inner point is illustrated with a white circle and Pa, while the outer point is illustrated with a white circle and Pb. Furthermore, a direction from a side that connects the outer point and the end point to a side that connects the starting point and the inner point can be regarded as an entry direction (travel direction) of the tractor into the field.

A region other than the entrance passage in the field, that is, the target work region which is the valid work region is prescribed by a contour line obtained by connecting the starting point, the three intermediate points, the end point, and the inner point. This contour line, which is substantially obtained by traveling of the tractor, is not necessarily accurate. For example, when there are recessed or protruding sections over which the tractor cannot travel, such recessed or protruding sections are neglected. Therefore, the shape editing unit 626 is provided that modifies the contour line obtained by connecting the starting point, the three intermediate points, the end point, and the inner point. This shape editing unit 626 enables the user to edit the contour line displayed on the touch panel 60, for example, in a manner of editing a Bézier curve.

Note that when the optional inner point registration unit 627 can be used, after registration of the end point, the driver further operates the tractor such that the aiming point T1 comes to a right end (first endpoint) downward along the entrance passage to an endpoint inside the boundary line of the entrance passage and the target work region, stops the tractor at a position to which the aiming point T1 comes, and then pushes the registration button RB. Accordingly, the inner point registration unit 627 registers the position as the inner point (illustrated with a white circle and Pa in FIG. 4).

Although only the aiming point T1 has been used in the above description, the other aiming points T2, T3, and T4 may be able to easily approach a target position in some cases. In particular, when approaching backward, the aiming points T3 and T4 are convenient. In such a case, selecting and pushing a button corresponding to the desired aiming point from the aiming point selection buttons B1, B2, B3, and B4 cause the valid aiming point to be changed.

When the target work region is determined, the travel route generation unit 63 generates the travel route for the work vehicle to automatically travel in the target work region. In FIG. 4, the travel route to be generated includes an inside travel route including straight movement routes and U-turn routes that connect the straight movement routes, and a circumferential travel route for performing circumferential travel in an outer region of the field.

Specifically, the circumferential travel route is determined as follows. The outer region is also a region in which the tractor performs U-turn travel. A width of the outer region required for the U-turn travel of the tractor is calculated on the basis of a work width and an appropriate turning radius of the tractor. A turning count of the tractor is calculated. That is, the turning count is determined such that a value of an integral multiple (turning count) of the work width of the tractor (accurately, work width in consideration of an overlap width) exceeds the width of the outer region necessary for U-turn travel. The actual width of the outer region is determined on the basis of this determined turning count. In general tilling work, a region corresponding to the two to three-round circumferential travel route is set as the outer region. A region inside the outer region serves as a central region where the work travel of substantially straight movement is performed.

The straight movement routes are determined as follows. A reference straight line that extends in parallel with a reference side of the work field is determined. This reference straight line serves as a base for the travel route in the central region. Determination of such a reference straight line is pre-processing for generating the inside travel route. At that time, a longest side of an approximate polygon created by an external shape of the field is generally employed as the reference side of the field. In the work field (field) as illustrated in FIG. 4, the external shape is an approximate quadrangle, and the longest side is selected as the reference side. Straight lines that are parallel with this reference side and fill the central region in work width is set as the reference straight lines. Then, the reference straight lines in the central region are the straight movement routes, and generates the continuous inside travel routes by connecting the straight movement routes with the U-turn routes.

As a matter of course, instead of this, an algorithm may be employed that generates a spiral travel route along which the tractor travels spirally in the field, and other travel routes.

As illustrated in FIG. 3, the controlling unit 5, which is a core element of the control system of the tractor, includes an output processing unit 7 and an input processing unit 8, which respectively function as input and output interfaces, and a communication processing unit 70. The output processing unit 7 is coupled to devices equipped in the tractor, such as vehicle travel instruments 71, work device instruments 72, and a notification device 73. The vehicle travel instruments 71 include the steering motor 14, and although not illustrated, devices to be controlled for allowing the vehicle to travel, such as a transmission mechanism and an engine unit. The work device instruments 72 include devices such as a drive mechanism for the work device 30 and the lifting mechanism 31 that raises and lowers the work device 30. The notification device 73 includes a display, lamps, and a speaker. The notification device 73 is used for notifying the driver or supervisor of attention information and warning information, such as travel precautions and deviation from the target travel route when the work vehicle is automatically steered. The communication processing unit 70 has a function of transmitting data processed by the controlling unit 5 to the control computer 100, and receiving various kinds of data from the control computer 100. Furthermore, the communication processing unit 70 inputs remote control instructions from the remote controller 84.

The input processing unit 8 is coupled to, for example, the satellite positioning module 80, travel system detection sensors 81, work system detection sensors 82, and an automatic/manual switch 83. The travel system detection sensors 81 include sensors for detecting travel states such as an engine speed and a transmission state. The work system detection sensors 82 include sensors for detecting a position and inclination of the work device 30, sensors for detecting workloads, and the like. The automatic/manual switch 83 is a switch for selecting either an automatic travel mode for traveling with automatic steering or a manual steering mode for traveling with manual steering.

Furthermore, the controlling unit 5 includes a travel control unit 50, a work control unit 54, an own position calculation unit 53, a travel route setting unit 55, and a notification unit 56. Based on positioning data sent from the satellite positioning module 80, the own position calculation unit 53 calculates the own position. During the above-described teaching travel, the calculated own position is provided to the work field shape calculation submodule. Since the automatic travel (automatic steering) mode and the manual travel (manual steering) mode are both configured to be available in this tractor for traveling, the travel control unit 50 for controlling the vehicle travel instruments 71 includes a manual travel control unit 51 and an automatic travel control unit 52. In accordance with operations of the driver, the manual travel control unit 51 controls the vehicle travel instruments 71. The automatic travel control unit 52 calculates discrepancies in direction and position between the travel route that is set by the travel route setting unit 55 and the own position, and generates an automatic steering instruction. This automatic steering instruction is output to the steering motor 14 via the output processing unit 7. The automatic travel control unit 52 stops the tractor on the basis of a stop instruction from the remote controller 84, and causes the tractor to start travel on the basis of a starting instruction from the remote controller 84. To control movement of the work device 30, the work control unit 54 provides control signals to the work device instruments 72. The notification unit 56 generates notification signals (display data and voice data) for notifying information necessary for the driver or the supervisor, and provides the notification signals to the notification device 73 incorporated into an instruments panel.

The travel route setting unit 55 receives the travel route generated by the route generation module 6 via the communication processing unit 70 from the travel route generation unit 63 of the general purpose terminal 4. The travel route setting unit 55 then sets the travel route as a target travel route for the tractor.

Other Embodiments (1) In the above-described exemplary embodiment, the position and shape of the entrance of the work field is calculated, the target work region, which is a region obtained by excluding the entrance from the work field, is calculated, and the travel route for automatically traveling in the target work region is generated. Instead of this exemplary embodiment, an exemplary embodiment may be employed that calculates a shape of an arbitrary region in the work field as the target work region and generates the travel route independently of the entrance. In such a travel route generation device, the entrance passage information generation unit 625 and the inner point registration unit 627 become unnecessary in the work field shape calculation submodule 62 of the route generation module 6.

(2) In the above-described exemplary embodiment, the tractor used for actual work is equipped with the route generation module 6, and the aiming points T1, T2, T3, and T4 are also prescribed at corners of the tractor. Instead of this, a vehicle other than the tractor, for example, a multiple-purpose vehicle that can travel in the work field (field) at a higher speed and includes a satellite positioning function may be equipped with the route generation module 6 or the work field shape calculation submodule 62 to calculate the shape of the work field (field).

(3) Hardware and programs in the diagram illustrated in FIG. 3 are classified mainly for purposes of description. Actually, each of the hardware and programs can be integrated with another hardware or other programs. Alternatively, each of the hardware and programs can be divided into pieces of hardware or a plurality of programs. For example, the route generation module 6, in particular, the travel route generation unit 63 may be configured within the controlling unit 5 of the work vehicle.

(4) The tractor equipped with the rotary tilling machine as the work device 30 has been described as the work vehicle in the above-described exemplary embodiment. In addition to such a tractor, for example, the exemplary embodiment is applicable to agricultural vehicles including rice transplanters, fertilizer distributors, and combines.

INDUSTRIAL APPLICABILITY

The travel route generation device according to the embodiment of the present invention is applicable to the work vehicle that works along the set travel route in the work field.

A travel route generation device according to the embodiment of the present invention is a device for a work vehicle that enters and leaves a work field divided by a boundary through an entrance passage, the travel route generation device including: a starting point registration unit that position-registers a first endpoint on a side of the boundary of the entrance passage as a starting point; an intermediate point registration unit that position-registers a shape feature point that prescribes a shape of the work field as an intermediate point; an end point registration unit that position-registers a second endpoint facing the first endpoint on a side of the boundary of the entrance passage as an end point; a basic shape calculation unit that calculates a basic shape of the work field by connecting a position of the starting point, a position of the intermediate point, and a position of the end point; an entrance passage information generation unit that generates entrance passage information with a quadrangle as a shape of the entrance passage, the quadrangle having the starting point and the end point as opposite vertices and having two sides along an external shape extension line of the basic shape; and a travel route generation unit that defines a region other than the entrance passage of the work field as a target work region, and generates a travel route for the work vehicle to automatically travel in the target work region.

Note that terms indicating geometrical shapes used in the embodiment of the present invention, for example, a triangle, a quadrangle, a rectangle, and a polygon are not used in order to identify a geometrically strict shape, but are used in order to describe such a shape almost as a whole. Therefore, each side of a polygon is not always a straight line and may be slightly bended or uneven.

This configuration allows calculation of the basic shape of the work field by connecting the position of the starting point, the position of the intermediate point, and the position of the end point acquired in movement along the boundary of the work field that leaves one end of the entrance passage and returns to the other end of the entrance passage. The work field is regarded as a polygon and the intermediate point corresponds to a polygon vertex, which is a feature point of the shape. When the work field is a triangle, the number of intermediate points is two, when the work field is a quadrangle, the number of intermediate points is three, and when the work field is a pentagon, the number of intermediate points is four. The entrance passage can be regarded as a quadrangle that is substantially a rectangle. Since the starting point and the end point correspond to opposite vertices of the rectangle, the shape of the rectangle indicating the entrance passage can be calculated. Accordingly, the basic shape of the work field is a polygon in which a small rectangle (quadrangle) is interposed at a place corresponding to the entrance passage. Therefore, the target work region in which the work vehicle needs to work is obtained by removing the rectangle indicating the entrance passage from the calculated work field shape. The travel route generation unit generates the travel route that covers this target work region, thereby providing the travel route that causes neither problem that the travel route and the entrance passage overlap each other nor problem that the travel route is distant from the entrance passage.

Since the entrance passage is inclined in the work field such as a field, it is important that travel of the work vehicle that enters the target work region from the entrance passage is straight movement and that travel of the work vehicle immediately before leaving the target work region for the entrance passage is straight movement. Accordingly, it is important to consider a travel direction of the work vehicle in the entrance passage as one of conditions of travel route generation. Therefore, it is advantageous when the travel direction in the entrance passage is also calculated in addition to the shape of the entrance passage. For this object, according to one advantageous exemplary embodiment of the present invention, the entrance passage information generation unit defines vertices other than the starting point and the end point of the quadrangle representing the shape of the entrance passage as an inner point that is adjacent to the target work region and an outer point distant from the target work region, and a direction from a side connecting the outer point and the end point to a side connecting the starting point and the inner point is an entry direction of the work vehicle into the target work region.

When it is assumed that the shape of the entrance passage is a quadrangle, the inner point and the outer point can be calculated from the positions of the starting point and the end point, which are opposite vertices of the quadrangle. Since the position of the inner point determines a boundary of the entrance passage and the target work region, it is preferable to detect as actual position as possible. Therefore, according to one advantageous exemplary embodiment of the present invention, an inner point registration unit is provided that defines vertices other than the starting point and the end point of the quadrangle representing the shape of the entrance passage as an inner point that is adjacent to the target work region and an outer point distant from the target work region, and registers the inner point. Employing the inner point registered as an actual position allows more accurate calculation of the shape of the entrance passage.

Position coordinates needed for position-registration of the starting point, the intermediate point, and the end point may be a work field coordinate system or a latitude longitude system. However, a satellite positioning module is mounted on the work vehicle that travels automatically, and it is advantageous to use this satellite positioning module. Therefore, according to one advantageous exemplary embodiment of the present invention, position-registration of the starting point, the intermediate point, and the end point is performed through traveling of the work vehicle along the boundary, and the positions of the starting point, the intermediate point, and the end point are calculated using an own position based on positioning data from a satellite positioning module mounted on the work vehicle. With this configuration, since the work vehicle itself is used as a position measuring instrument, movement for work field shape measurement is easy even if the work field is vast. A position detecting system using the satellite positioning module mounted on the work vehicle is used, which is advantageous in terms of cost as well.

When the work vehicle itself is used as a position measuring instrument, even when the work vehicle approaches the shape feature point of the work field (a vertex of a polygon), there is a distance between the own position that is typically set for automatic travel and the position of the shape feature point. In order to solve a positional error caused by this distance, one advantageous exemplary embodiment of the present invention is configured such that one or more aiming points associated with the positions of the starting point, the intermediate point, and the end point are prescribed at corners of the work vehicle, and the positions of the starting point, the intermediate point, and the end point are calculated by modifying the own position according to distances from the own position to the aiming points. This enables the work vehicle to measure the positions accurately only by causing an appropriate corner (aiming point) of the work vehicle to approach the shape feature point of the work field. Preferably, setting such aiming points at a front right end, front left end, rear right end, and rear left end of the work vehicle and selecting one of the four ends allow the aiming point to smoothly match the shape feature point of the work field.

The embodiment of the present invention is also applied to a travel route generation device that calculates a shape of an arbitrary region in the work field as the target work region and generates the travel route independently of the entrance. Such a travel route generation device for a work vehicle includes: a starting point registration unit that position-registers a first endpoint of a target work region for work travel as a starting point; an intermediate point registration unit that position-registers a shape feature point that prescribes a shape of the target work region as an intermediate point; an end point registration unit that position-registers the first endpoint or a second endpoint adjacent to the first endpoint as an end point; a basic shape calculation unit that calculates a basic shape of the target work region by connecting a position of the starting point, a position of the intermediate point, and a position of the end point; and a travel route generation unit that generates a travel route for the work vehicle to automatically travel in the target work region, wherein one or more aiming points associated with the positions of the starting point, the intermediate point, and the end point are prescribed at corners of the work vehicle or a vehicle capable of traveling in the target work region, and the positions of the starting point, the intermediate point, and the end point are calculated by modifying an own position according to distances from the own position to the aiming points. This travel route generation device, which uses the work vehicle or a vehicle capable of traveling in the target work region as a position measuring instrument, can calculate the shape smoothly even if the target work region is vast.

Functions of the travel route generation device described above can be substantially implemented by execution of a computer program installed in a computer. Therefore, the scope of the present invention also covers such a computer program. A travel route generation program according to the embodiment of the present invention is a program for a work vehicle that enters and leaves a work field divided by a boundary through an entrance passage. The travel route generation program causes a computer to execute: a starting point registration function of position-registering a first endpoint on a side of the boundary of the entrance passage as a starting point; an intermediate point registration function of position-registering a shape feature point that prescribes a shape of the work field as an intermediate point; an end point registration function of position-registering a second endpoint facing the first endpoint on a side of the boundary of the entrance passage as an end point; a basic shape calculation function of calculating a basic shape of the work field by connecting a position of the starting point, a position of the intermediate point, and a position of the end point; an entrance passage information generation function of generating entrance passage information with a quadrangle as a shape of the entrance passage, the quadrangle having the starting point and the end point as opposite vertices and having two sides along an external shape extension line of the basic shape; and a travel route generation function of defining a region other than the entrance passage of the work field as a target work region, and generating a travel route for the work vehicle to automatically travel in the target work region. Functions and effects of this travel route generation program are identical to functions and effects of the above-described travel route generation device. In addition, the above-described advantageous exemplary embodiment of the travel route generation device is also applicable to this travel route generation program.

Similarly, the embodiment of the present invention is also applied to a travel route generation program that calculates a shape of an arbitrary region in the work field as a target work region and generates a travel route independently of the entrance. This travel route generation program for a work vehicle causes a computer to execute: a starting point registration function of position-registering a first endpoint of a target work region for work travel as a starting point; an intermediate point registration function of position-registering a shape feature point that prescribes a shape of the target work region as an intermediate point; an end point registration function of position-registering the first endpoint or a second endpoint adjacent to the first endpoint as an end point; a basic shape calculation function of calculating a basic shape of the target work region by connecting a position of the starting point, a position of the intermediate point, and a position of the end point; a travel route generation function of generating a travel route for the work vehicle to automatically travel in the target work region; and a function of calculating the positions of the starting point, the intermediate point, and the end point, by modifying an own position according to distances from the own position to one or more aiming points associated with the positions of the starting point, the intermediate point, and the end point, the aiming points being prescribed at corners of the work vehicle or a vehicle capable of traveling in the target work region. Functions and effects of this travel route generation program are also identical to the functions and effects of the above-described travel route generation device. In addition, the above-described advantageous exemplary embodiment of the travel route generation device is also applicable to this travel route generation program.

Obviously, numerous modifications and variations of the present invention are possible in light of the above teachings. It is therefore to be understood that within the scope of the appended claims, the invention may be practiced otherwise than as specifically described herein.

What is claimed is:

1. A travel route generation device comprising:
 a position sensor to detect a position of a reference point on a work vehicle, the work vehicle being to travel in a work field;
 a point input interface via which a starting vehicle position is input, by a user, such that the reference point is positioned at the starting vehicle position when a contour point on an outermost contour of the work vehicle is substantially on a starting point when viewed in a vertical direction, via which an end vehicle position is input such that the reference point is positioned at the end vehicle position when the contour point is substantially on an end point when viewed in the vertical direction, and via which intermediate vehicle positions are input such that the reference point is positioned at the intermediate vehicle positions when the contour point is substantially on the intermediate points when viewed in the vertical direction, the starting point, the end point, and the intermediate points defining a shape of a target work region in which the work vehicle is to work in the work field; and
 circuitry configured to
  calculate positions of the starting point, the end point, and the intermediate points from the start vehicle position, the end vehicle position, and the intermediate vehicle positions, respectively, based on a distance from the contour point to the reference point, define the shape of the target work region by calculating a line connecting the starting point, the intermediate points, and the end point, the line defining the shape of the target work region, and generate a travel route along which the work vehicle is to travel in the target work region.

2. The travel route generation device according to claim 1, wherein the contour point is selected from candidate points including a front right end, a front left end, a rear right end, and a rear left end of the work vehicle.

3. The travel route generation device according to claim 1, wherein the starting point, the intermediate points, and the end point are corner points of the target work region.

4. The travel route generation device according to claim 1, wherein the target work region is defined such that a quadrangle is excluded from the target work region, a diagonal of the quadrangle being a line segment connecting the starting point and the end point, and wherein the quadrangle comprises:
   a first side extending along a first line from the starting point, the first line connecting the starting point and one of the intermediate points;
   a second side extending along a second line from the end point, the second line connecting another of the intermediate points and the end point;
   a third side extending from the start point in a direction parallel to the second side; and
   a fourth side extending from the end point in a direction parallel to the first side.

5. The travel route generation device according to claim 4, wherein the third side of quadrangle, the fourth side of quadrangle, and the line connecting the starting point, the intermediate points, and the end point define a contour of the target work region.

6. The travel route generation device according to claim 4, wherein the quadrangle defines a shape of an entrance passage through which the work vehicle is to enter the target work region.

7. The travel route generation device according to claim 6, wherein the entrance passage is a ramp sloped in a slope direction along the first side as viewed in a vertical direction perpendicular to the first line and the second line, and wherein a difference in level exists between the entrance passage and the end point along the second line.

8. The travel route generation device according to claim 2, wherein candidate points include a lateral end of a work device equipped with the work vehicle.

9. The travel route generation device according to claim 2, wherein candidate points include an edge of a wheel of the work vehicle.

10. A travel route generation method comprising:

Positioning, by a user using a point input interface, a contour point on an outermost contour of a work vehicle substantially on a starting point in a work field when viewed in a vertical direction;

detecting a position of a reference point on the work vehicle as a starting vehicle position when the contour point is substantially on the starting point;

positioning, using the point input interface, the contour point substantially on intermediate points in the work field when viewed in the vertical direction;

detecting positions of the reference point as intermediate vehicle positions when the contour point is substantially on the intermediate points, respectively;

positioning, using the point input interface, the contour point substantially on an end point in the work field when viewed in the vertical direction;

detecting a position of the reference point as an end vehicle position when the contour point is substantially on the end point;

calculate positions of the starting point, the intermediate points, and the end point from the start vehicle position, the intermediate vehicle positions, the end vehicle position, respectively, based on a distance from the contour point to the reference point; defining a shape of a target work region by calculating a line connecting the starting point, the intermediate points, and the end point, the line defining the shape of the target work region, the work vehicle being to work in the target work region; and generating a travel route along which the work vehicle is to travel in the target work region.

* * * * *